United States Patent [19]

Okuyama et al.

[11] Patent Number: 4,794,467
[45] Date of Patent: Dec. 27, 1988

[54] APPARATUS FOR AUTOMATICALLY SUPPLYING AND SELECTIVELY REPRODUCING A PLURALITY OF CASSETTES AND FOR AVOIDING THE REPRODUCING OF DEGRADED SIGNALS

[75] Inventors: Yoshikazu Okuyama; Hideki Nakamura, both of Kanagawa, Japan

[73] Assignee: Sony Corporation, Tokyo, Japan

[21] Appl. No.: 39,447

[22] Filed: Apr. 17, 1987

[30] Foreign Application Priority Data

May 10, 1986 [JP] Japan ................... 61-107379
May 10, 1986 [JP] Japan ................... 61-107380

[51] Int. Cl.$^4$ .................. G11B 15/68; G11B 5/86
[52] U.S. Cl. ........................ 360/15; 360/91; 360/92; 360/93; 324/212
[58] Field of Search .............. 360/13, 14.1, 15, 31, 360/12, 91, 92, 93, 53, 69, 25; 369/58; 324/212; 358/139, 185, 102, 310, 335, 327, 336

[56] References Cited

U.S. PATENT DOCUMENTS 4,644,425  2/1987  Tamaki .................... 360/69
4,686,563  8/1987  Fountain et al. .......... 360/31

Primary Examiner—Raymond F. Cardillo
Assistant Examiner—Kevin Fournier
Attorney, Agent, or Firm—Curtis, Morris & Safford

[57] ABSTRACT

In an apparatus for automatically supplying and selectively reproducing a plurality of cassettes, the error rate for each cassette and for each reproduction is automatically generated and stored in a separate area of a memory and, when the error rate exceeds a threshold rate, the deteriorating cassettes are automatically dubbed onto blank cassettes to ensure that deterioration of each tape or other record medium never exceeds a predetermined amount. In addition, the operator may independently cause any cassette to be dubbed when he deems the image produced therefrom to be too highly degraded regardless of the error rate of the signal recorded therein.

18 Claims, 6 Drawing Sheets

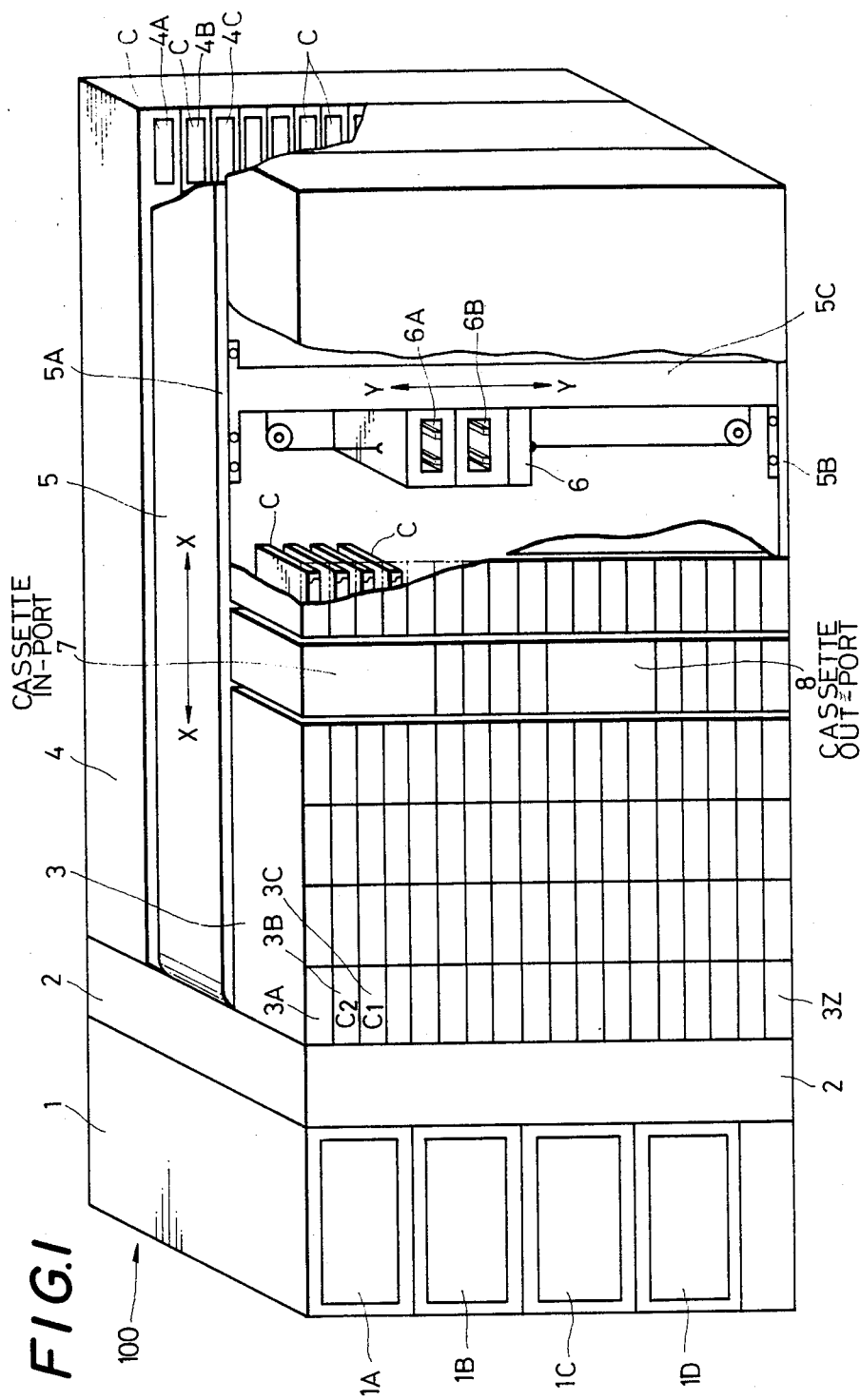

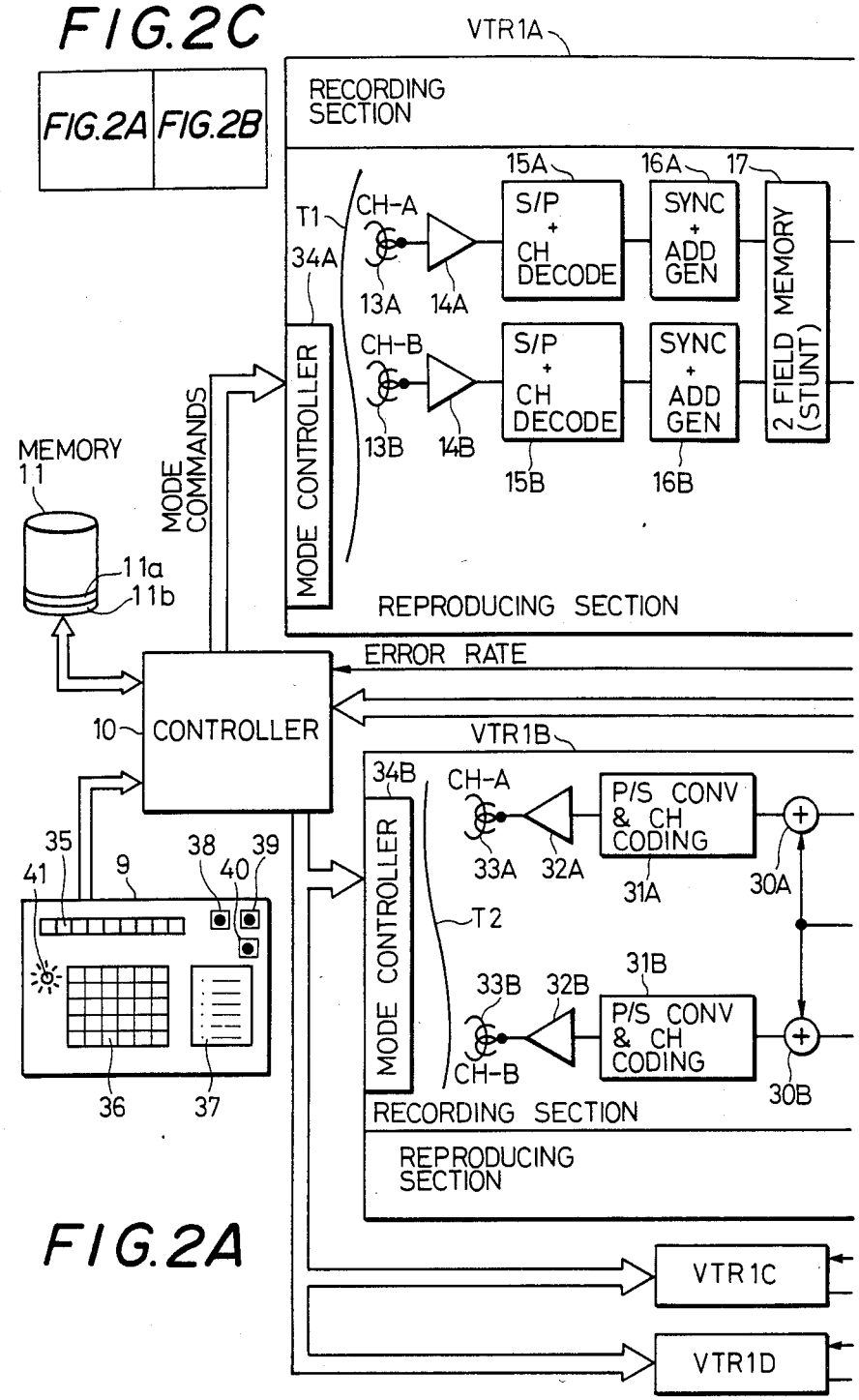

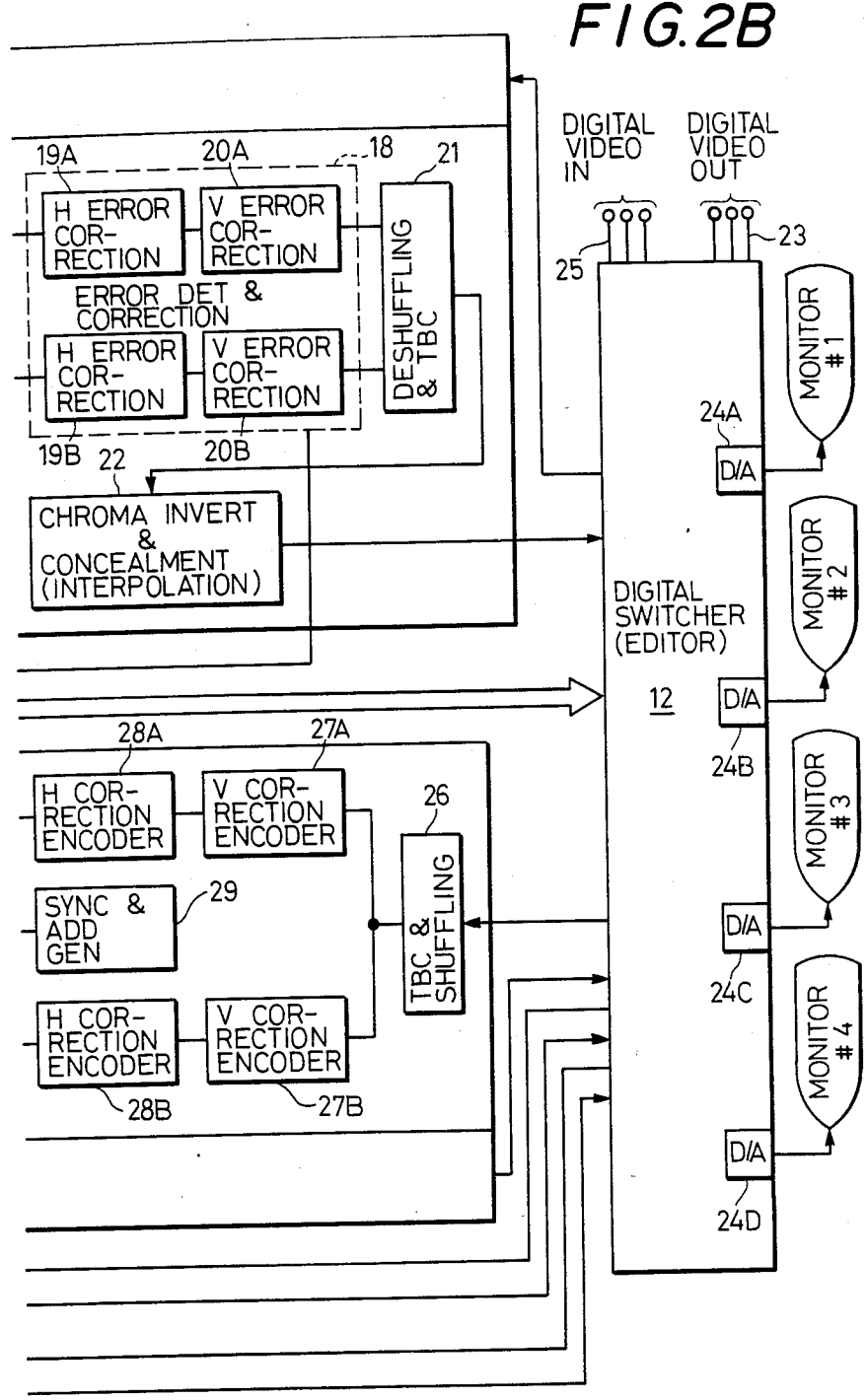

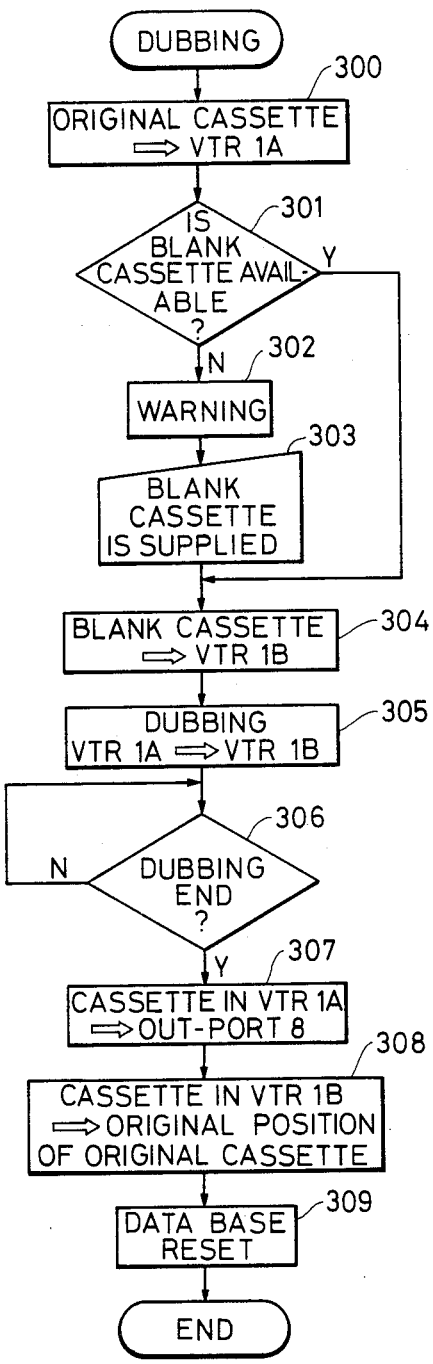

APPARATUS FOR AUTOMATICALLY SUPPLYING AND SELECTIVELY REPRODUCING A PLURALITY OF CASSETTES AND FOR AVOIDING THE REPRODUCING OF DEGRADED SIGNALS

FIELD OF THE INVENTION

This invention relates to an apparatus for automatically supplying and selectively reproducing cassettes and more particularly relates to an automatic cassette supply and reproducing apparatus suited for use at a television broadcasting station.

DESCRIPTION OF THE PRIOR ART

With the development of the video tape recorder (VTR), many television broadcasting stations now operate with programs and commercials recorded individually on respective video tape cassettes and employ a number of separate VTRs operating one at a time in a controlled sequence to present a continuous output video signal to be broadcast and which is formed of a plurality of individual programs and commercials in sequence. A centralized timing control system determines the respective start and stop times for each of the individual VTRs and, as each cassette is played and its program completed, that cassette is removed from the VTR and a new cassette is inserted therein in anticipation of its reproduction at the appropriate time. While the removal and insertion of the individual cassettes into the VTRs at appropriate times was originally performed by hand, the development of extremely short commercials and announcements, for example, lasting only 10 or 15 seconds, has made the necessary operator activity burdensome and subject to error.

Therefore, it has been previously proposed to provide apparatus for supplying and selectively reproducing the tape cassettes, in which the selection and transfer of the individual cassettes to the individual VTRs and the timing control thereof has been performed automatically. An example of such an apparatus is disclosed in U.S. patent application Ser. No. 06/719,066, filed Apr. 2, 1985, assigned in common with the present application and which issued as U.S. Pat. No. 4,644,425 on Feb. 17, 1987. As described therein, the apparatus generally includes a number of VTRs and a cassette housing block provided with banks or racks of storage bins each accommodating therein a respective cassette in which a video signal for a particular program or commercial is recorded. The cassettes are selectively removed from the storage bins and automatically transported by a cassette feeder or carriage to be loaded into the VTRs, and then are taken out from the VTRs after play and transported back by the carriage for return to the individual storage bins. The cassettes bear identifying bar codes which are read during storage thereof in respective bins and the identity of each cassette and its location in a particular storage bin are stored in a central control computer. In this automatic system, several thousands of cassettes may be stored in the storage bins, and the program selection and transmission system is controlled by the central control computer to transmit the programs according to a predetermined schedule in which the signals sequentially reproduced by the VTRs are selectively transmitted at selected times in the sequenced order by, for example, a broadcast antenna or a cable television network.

However, when a cassette is frequently used in this automatic system, for example, when it is a popular commercial played many times a day, the image reproduced therefrom becomes gradually degraded. This could result from physical degradation, for example when dust or grease becomes embedded in the tape inside the cassette or when the tape is scratched during reproduction, or from magnetic degradation, in which the magnetic surface of the tape becomes depolarized due to heat or proximity of a magnetic field. Such types of degradation are generally progressive, so that the reproduced image becomes progressively worse with each playback. Advantageously, the quality of the image produced should be checked with each playback, and the recorded video signal should be dubbed to a new cassette before the degradation in image quality becomes too pronounced. However, given the several thousands of cassettes available in the bins, it is difficult for operators to individually review and control the quality of all the cassettes concurrently. Therefore, it would be highly advantageous to provide an automatic system for consistently reviewing the quality of all the cassettes and for dubbing each cassette as it reaches a threshold level of degradation.

However, an automatic system by itself may not be sufficient, as a machine operating within preset parameters will identify all cassettes generally degraded overall, but may not always properly identify a tape degraded in an unanticipated fashion. For example, a single severe moment of degradation, such as a flash, may render the total program unviewable while failing to meet, for example, an average degradation parameter preset into the automatic control computer. Therefore, it is advantageous to provide an alternative or additional operator monitored control system in which such unusual defects may be noted and corrected to compensate for any omissions in the operation of the automatic control computer.

OBJECTS AND SUMMARY OF THE INVENTION

Therefore, it is an object of the present invention to provide an automatic cassette supplying and reproducing apparatus which avoids the above-described difficulties of the prior art.

It is a further object of the present invention to provide an automatic cassette supplying and reproducing apparatus in which the signal quality of the individual cassettes is monitored during each playback and in which the cassettes are dubbed prior to their substantial degradation.

It is yet a further object of the present invention to provide an automatic cassette supplying and reproducing apparatus in which an error rate indicative of the signal quality of a cassette is compared with a threshold rate for determining the extent of degradation and in which all cassettes having an error rate higher than the threshold rate are dubbed or copied into previously blank cassettes and then discarded.

It is still a further object of the present invention to provide an automatic cassette supplying and reproducing apparatus including a monitor on which the image corresponding to the signal reproduced from a cassette may be viewed and an operator actuated control for causing the cassette to be dubbed when a serious defect is observed.

In accordance with an aspect of the present invention, an apparatus for automatically supplying and selectively reproducing a plurality of cassettes having digital signals recorded on recording media therein comprises a plurality of digital reproducing/recording units operative for dubbing and having detector means for detecting errors in the digital signals reproduced thereby, a cassette housing block having a plurality of bins for storing respective cassettes therein, cassette transporting means for selectively transporting cassettes between the bins and the reproducing/recording units, and control means for controlling the operation of the reproducing/recording units and the cassette transporting means and which comprises memory means having a plurality of memory areas respectively corresponding to the plurality of cassettes and connected to the detector means for storing an error rate of the digital signal reproduced from a selected one of the cassettes in the corresponding memory area, comparator means for comparing the stored error rate for that one cassette with a threshold rate and producing an output in response thereto, and dubbing control means for controlling dubbing of the digital signal from that one cassette into a blank cassette in response to the output of the comparator means.

In accordance with a further aspect of the present invention, apparatus for automatically supplying and selectively reproducing a plurality of cassettes comprises a plurality of reproducing/recording units, a cassette housing block having a plurality of bins for storing respective cassettes therein, cassette transporting means for selectively transporting the cassettes between the bins and the reproducing/recording units, monitor means for displaying an image corresponding to a signal reproduced from a selected one of the cassettes by one of the reproducing/recording units, manually actuable input means for generating a defect signal when a defect is observed in the displayed image, and memory means having a plurality of memory areas respectively corresponding to the plurality of cassettes and being responsive to each defect signal for storing a flag in the memory area corresponding to the cassette selected for reproducing.

The above, and other objects, features and advantages of the present invention, will become apparent from the following detailed description of a preferred embodiment taken in conjunction with the accompanying drawings, throughout which like reference numerals designate like elements and parts.

BRIEF DESCRIPTION OF THE DRAWINGS

FIG. 1 is a perspective view of an automatic cassette supplying and reproducing apparatus in accordance with an embodiment of the present invention and which is shown partially cut away and in section;

FIGS. 2A and 2B are respectively portions of a block diagram of the apparatus of FIG. 1;

FIG. 2C is a diagram illustrating the proper combination of FIGS. 2A and 2B.

FIG. 4 is a flowchart to which reference will be made in describing details of a dubbing operation performed by the apparatus of FIG. 1.

DESCRIPTION OF A PREFERRED EMBODIMENT

Figure 3:
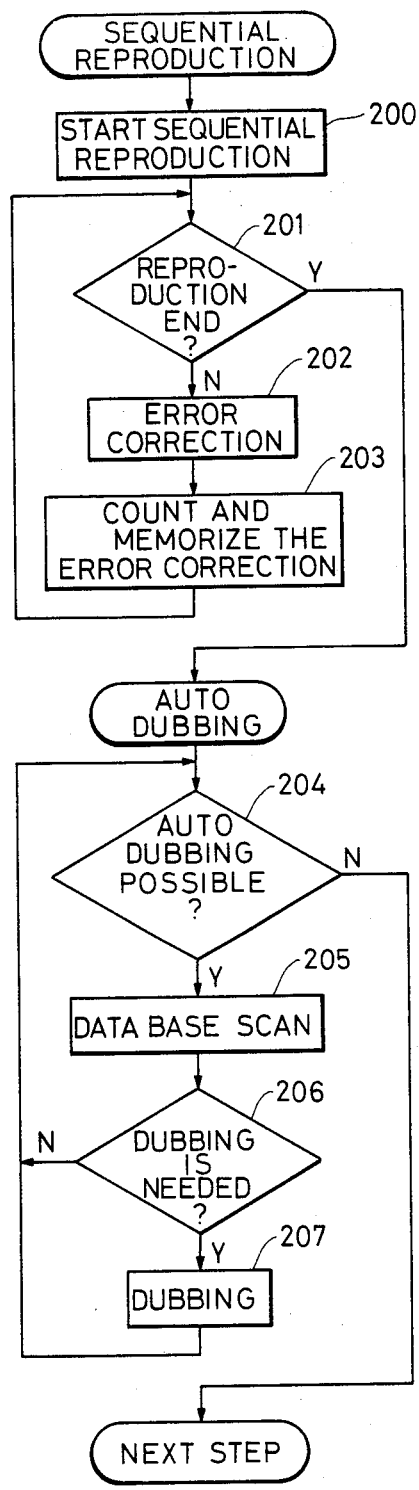
FIG. 3 is a flowchart to which reference will be made in describing a sequential reproduction/auto dubbing operation of the apparatus of FIG. 1.

Referring to the drawings in detail, and initially to FIG. 1 thereof, it will be seen that an automatic cassette supplying and reproducing apparatus according to an embodiment of this invention generally comprises an upright, rectangular housing 100 including a VTR console 1 having a plurality of reproducing/recording devices, such as VTRs 1A, 1B, 1C and 1D, stacked vertically one above the other at one side of the housing 100. A cassette delivery mechanism 2 is provided to deliver to VTR console 1 video tape cassettes C selected from a large number of cassette storage bins 3A,3B, 3C, . . . ,3Z and 4A,4B,4C, . . . , arrayed in orthogonally related directions, that is, in vertical stacks which are arranged horizontally in succession, in front and rear banks 3 and 4. Each of the storage bins in banks 3 and 4 is adapted to store a single video tape cassette C therein. Further, as is apparent in FIG. 1, the stacks of storage bins in front and rear banks 3,4 are spaced apart to provide an aisle therebetween which accommodates a cassette transporting mechanism 5. VTRs 1A-1D are of a so-called side-loading type so as to be each capable of receiving a cassette C at the side of the respective VTR 1A-1D facing delivery mechanism 2 from the transporting mechanism 5 between the banks 3 and 4.

Cassette transporting mechanism 5 generally comprises fixed upper and lower guide rails 5A and 5B extending horizontally along the aisle between banks 3 and 4 at the top and bottom, respectively, of housing 100 and a moveable guide rail 5C extending vertically in the aisle between front and rear banks 3,4 and mounted, at its upper and lower ends, on rails 5A and 5B, for movements horizontally in the directions indicated by arrows X—X in FIG. 1. A cassette feeder or carriage 6 is mounted on guide rail 5C for movements vertically along the latter in the directions indicated by arrows Y—Y in FIG. 1. Both guide rail 5C and carriage 6 are moved in their respective directions by a drive mechanism (not illustrated).

In addition, housing 100 includes a cassette in-port 7 and a cassette out-port 8. A cassette C inserted manually or automatically into in-port 7 is received and transported by carriage 6 of transporting mechanism 5 to a selected storage bin. On the other hand, upon entry of an eject command all cassettes C identified as defective, as described below, are successively removed from their respective storage bins by carriage 6 of transporting mechanism 5 and carried thereby to out-port 8 for ejection through the latter.

In the operation of the above-described apparatus, a selected cassette, for example, cassette C1, is removed by carriage 6 from its respective carriage storage bin 3C, whereupon carriage 6 is moved vertically as needed in the direction of the arrow Y—Y relative to vertical guide rail 5C which, in turn, is moved horizontally in the direction of the arrows X—X so as to register with the side-loading port or opening of a selected one of the VTRs 1A-1D, and the transported cassette C1 is then transferred from carriage 6 through delivery mechanism 2 into the selected VTR 1A-1D for reproducing or recording a signal on the tape in the selected cassette C1. After the desired recording or reproducing operation has been performed in the selected VTR 1A-1D, the used cassette is returned through delivery mechanism 2 to carriage 6 on vertical guide rail 5C which is then moved horizontally in the direction of the arrows X—X, whereupon carriage 6 is moved vertically in the direction of the arrows Y—Y for registering carriage 6 with the storage bin into which the used cassette C1 is to be returned. This may or may not be storage bin 3C from which cassette C1 was originally selected. Then, the returned cassette C1 is transferred from carriage 6 to the storage bin 3A,3B,3C,---, or 4A,4B,4C,---, with which it is registered.

Further details of the structure and operation of carriage 6 and guide rails 5A–5C may be found in the above-cited U.S. Pat. No. 4,644,425, as well as in a copending applications identified by attorney docket numbers (SO3245—S87P89) and (SO3246—S87P90), all of which are assigned in common with the present application. However, the structure and operation of carriage 6 and guide rails 5A–5C do not form a part of the present invention and will not be further described herein.

Referring now to FIGS. 2A and 2B, taken together as illustrated in FIG. 2C, the automatic cassette selecting and reproducing apparatus according to the present invention is further seen to include a control panel 9, a controller 10, a memory 11 and a digital switcher or editor 12 associated with VTRs 1A–1D. The structure and operation of each of the VTRs 1A–1D are generally conventional and will be described only briefly. All of VTRs 1A–1D may be identical in the preferred embodiment of the present invention, with the reproducing section of each being as illustrated in detail in respect to VTR 1A, and with the recording section of each VTR being as illustrated in detail in respect to VTR 1B. As shown with regard to VTR 1A, a digital signal recorded as two channel signals CH-A and CH-B is reproduced by respective transducing heads 13A and 13B from a tape T1 withdrawn from cassette C1. The tape loading mechanism of VTR 1A and the structure of cassette C1 are conventional and for the sake of simplicity are not illustrated. Channel signals CH-A, CH-B are respectively transmitted from transducing heads 13A, 13B through respective amplifiers 14A, 14B to respective serial/parallel converters and channel decoders 15A–15B. The signals output therefrom are supplied to respective synchronizing signal and address detectors 16A, 16B and then to a two-field memory 17, which advantageously stores up to two fields of the reproduced digital signal so that non-normal reproduction modes, such as still-frame or slow motion, may be provided. The output signals from memory 17 are supplied to an error detection and correction circuit 18 which includes horizontal error correctors 19A, 19B and vertical error correctors 20A, 20B for channel signals CH-A and CH-B, respectively. Both the error-corrected channel signals CH-A and CH-B are then supplied to a de-shuffling and time base correcting circuit 21, wherein the two channel signals CH-A, CH-B are combined and corrected for time base errors, and the combined digital signal is supplied to a chroma inversion and concealment circuit 22, wherein error concealment by means of interpolation is performed to conceal any errors remaining after detection and correction in error detection and correction circuit 18 and the phase of the interpolated chrominance is inverted where necessary.

The adjusted, error-concealed signal from chroma inversion and concealment circuit 22 is the reproduced digital video signal output from VTR 1A and is supplied to a digital switching or editor 12, from which it may be output as a digital video signal through digital video out terminals 23, and/or may be converted to a conventional analog video signal through digital-to-analog converters 24A–24C for display at corresponding monitors #1, #2, #3 and #4. The digital video signals supplied at video out terminals 23 may generally be supplied to a transmission network, such as a cable T.V. system or to a conventional television broadcasting system as the output broadcast signal.

In accordance with an aspect of the present invention, the reproduced digital video signal supplied to editor 12 from VTR 1A may be supplied from editor 12 to VTR 1B for digital dubbing in VTR 1B onto a tape T2 of another cassette C2, which is also not illustrated for the sake of simplicity. VTR 1B may be alternatively supplied with an external digital video signal received by editor 12 at digital video in terminals 25, but this feature does not form a part of the present invention and will not be described in detail.

The reproduced digital video signal from VTR 1A, upon being supplied to the recording section of VTR 1B, is initially received by a time base corrector and shuffling circuit 26 which shuffles or separates the input digital video signal into channel signals CH-A and CH-B. Such digital channel signals CH-A and CH-B are respectively supplied first to vertical correction encoders 27A, 27B and then to horizontal correction encoders 28A, 28B wherein the respective channel signals CH-A, CH-B are encoded in accordance with a selected known error encoding technique. Synchronizing signals and addresses are generated in a sync and address generator 29 and are added to both channel signals CH-A and CH-B in respective adders 30A, 30B. The resultant signals are then respectively supplied to parallel/serial converters and channel coding circuits 31A, 31B and then through amplifiers 32A, 32B to respective transducing heads 33A, 33B for recording in two channels on tape T2.

Thus, VTR 1A reproduces or plays back cassette C1 to provide an output digital video signal which may be either supplied for broadcast through digital video out terminals 23 or supplied for dubbing or re-recording in cassette C2 by VTR 1B. Although not described in detail, it will be understood that a digital video signal from editor 12 may be correspondingly supplied to the recording section of VTR 1A for recording on tape T1 in cassette C1, while the reproducing section of VTR 1B may correspondingly produce a digital video signal for supply to editor 12. Similarly, VTRs 1C and 1D may provide reproduced digital video signals or may receive other digital video signals for recording in cassettes therein.

The modes of operation of VTRs 1A–1D are controlled by mode command signals transmitted from controller 10 to mode controllers, for example, as indicated at 34A and 34B in VTRs 1A and 1B. These mode command signals control the selection of either the recording or reproducing function of each of the VTRs 1A–1D and also control the selection of, for example, fast forward or other special reproduction or recording modes for each of the VTRs 1A–1D. Controller 10 itself is responsive to input commands entered through control panel 9, which includes a plurality of function keys 35 and a plurality of alphanumeric keys 36, actuable to create and enter the various input commands. Additionally, in accordance with an aspect of the present invention, display panel 9 includes a display 37, a defect identification pushbutton 38, a dubbing start pushbutton 39 and an eject pushbutton 40. An alarm indicator 41, advantageously in the form of a lamp or LED, is also provided on control panel 9 for indicating when no blank cassettes are presently available for receiving a dubbing signal, as will be described in detail below.

VTRs 1A-1D, have another features which is not conventional, that is, error detection and correction circuit 18 in each VTR produces an additional output signal corresponding to the error rate of the digital signal being reproduced, for example by VTR 1A from tape T1 in cassette C1. As noted above, after repeated playback operations the tape T1 may become damaged or demagnetized, and it is estimated that such damage will progressively increase with each playback. The detected error rate is a measure of the accumulated damage as of the present playback and is calculated per unit time, for example, the number of errors per field, per frame, or per second, or may be calculated as the number of errors per bit. In accordance with well known principles, error detection and correction circuit 18 will be able to correct errors occurring in the reproduced digital signal up to a predetermined error rate. The limit as to the rate of correctable errors will, of course, depend on the power of the particular error correction encoding scheme used in the horizontal and vertical correction encoders 27A,27B,28A,28B of the VTR used to record the reproduced signal. As long as the error rate is below the limit therefore determined by the particular encoding scheme, the reproduced digital signal can be completely corrected and the resultant image will be properly displayed. However, once the error rate exceeds the limit therefor, the reproduced digital signal can no longer be completely corrected and visible defects may begin to appear in the image displayed, for example, at monitor #1 or #2.

In accordance with the present invention, the error rate for each cassette is detected during each reproduction of the signal therefrom. Before the error rate exceeds the limit therefor, or more specifically at a time when the error rate exceeds a threshold rate less than the limit rate, the corrected reproduced digital video signal output from VTR 1A is dubbed digitally onto a new blank or previously unrecorded cassette, for example, cassette C2, and the original cassette C1 is discarded. Since the dubbing is performed at a time before the limit rate is reached, error detection and correction circuit 18 is effectively able to correct all the errors in the reproduced digital signal and so the output digital video signal is substantially error free. A typical threshold value might be $10^{-4}$, or 1 per 10,000 bits well below the limit rate but indicating significant degradation. Furthermore, since the output digital video signal itself is directly dubbed from cassette C1 to cassette C2 without being transformed or converted into a conventional analog television signal and back again, no new errors created by the transformation process will creep into the recorded digital video signal. Thus, the resultant cassette C2 is effectively a fresh recording without even the progressively accumulated errors appearing on the tape in cassette C1. In accordance with a further aspect of the present invention, cassette C2 is then stored in the storage bin, for example, storage bin C3, from which cassette C1 was originally selected to constitute a complete replacement therefor.

More specifically, the error rate determined by error detection and correction circuit 18 is supplied to controller 10 which then stores it at a corresponding memory area 11a within memory 11. For each cassette, there is a respective memory area 11a designated within memory 11, and such memory area is addressed in accordance with an identifying number associated with the respective cassette. Advantageously, memory 11 is a non-volatile memory or is provided with non-volatile back-up so that the stored error rates for the respective cassettes will not be lost over time or after power turn-off. Memory 11 may be adapted to store only the error rate detected for the most recent playback of a cassette or it may store the error rates for all past playbacks of a particular cassette to provide a history of the progressive degradation for use in projecting future degradation or in monitoring the operations of the VTRs. Furthermore, memory 11 may be adapted to store a single, average error rate for the entire tape in a cassette or the memory may store a number of error rates for successive intervals along the tape in a cassette. Although, in the preferred embodiment, the error rate is computed only from the errors corrected by error detection and correction circuit 18, in an alternative embodiment the error rate may be computed from the sum of the corrected errors and the concealed errors, that is, the number of error concealments performed by chroma inversion and concealment circuit 22.

Controller 10 is adapted upon manual actuation of eject pushbutton 40 to scan memory 11 and to identify all those cassettes C whose stored error rates exceed the threshold rate and to cause the identified cassettes C to be removed from their storage bins 3A,3B,3C,---, and 4A,4B,4C, ---, by carriage 6 and to be ejected through out-port 8. Similarly, actuation of dubbing start pushbutton 39 causes controller 10 to perform the same identification process, that is, to identify those cassettes whose stored error rates exceed the threshold rate, and then to cause all the identified cassettes C to be dubbed onto respective blank cassettes which are thereafter stored in the respective storage bins from which the identified cassettes C were removed. Finally, as dubbing of a signal from a cassette is completed, such used cassettes is ejected through out-port 8.

As illustrated by the flowchart of FIG. 3, in general, the operation of the automatic selecting and reproducing apparatus according to the present invention may be divided into two overall processes: that is, sequential reproduction and automatic or auto dubbing. When the automatic selecting and reproducing apparatus is activated to provide a continuous output digital video signal formed from the sequentially reproduced digital video signals recorded individually on several cassettes C, the sequential reproduction operation begins at step 200. In step 201, it is judged whether or not the sequential reproduction operation is concluded, for example, whether broadcasting has ended for the day or whether an external video signal supplied to editor 12 at video in terminals 25 is to be broadcast instead of a reproduced video signal from one of the VTRs. If sequential reproduction is proceeding, in step 202, the digital signal currently being reproduced, for example, from cassette C1, is corrected for errors by error detection and correction circuit 18. In step 203, the number of corrections performed per unit time is counted and the corresponding error rate, and preferably also the timing codes reproduced from tape T1 for identifying the locations on the tape of the corrected errors, are output from error detection and correction circuit 18 and supplied to controller 10 which stores them in the corresponding memory area 11a. Control then returns to step 201 and loops through steps 201-203 until sequential reproduction by one or more of VTRs 1A-1D is determined to have ended. It will be understood that, when, for example, reproduction has switched from cassette C1 in VTR 1A to reproduction from another cassette in another VTR, the process of steps 201-203 continues but now the counted error rate is stored in a different corresponding memory area 11b.

In step 201, when it has been determined that sequential reproduction has ended, operation of the automatic selecting and reproducing apparatus is switched to the auto dubbing process. Such switching may occur automatically at the end of each broadcast day, for example, or may result from actuation of dubbing start pushbutton 39. In step 204, it is determined whether the auto dubbing process may proceed. More particularly, as discussed in detail below, it is determined whether blank cassettes are available for auto dubbing. It is assumed that, at least two of the VTRs, for example, the VTRs 1A and 1B, are available when sequential reproduction has ended, but step 204 may include a check on the availability of at least two of VTRs 1A-1D during the auto dubbing process. If it is determined that auto dubbing may proceed, in step 205, the error rate currently stored in memory 11 for a first cassette, for example, in memory area 11a for cassette C1, is read out therefrom by controller 10.

In step 206, controller 10 identifies whether this first cassette C1 requires dubbing, or, more specifically, whether the stored error rate therefor exceeds the threshold rate. More particularly, in step 206, a stored average error rate for the entire tape in cassette C1 may be compared with the threshold rate, or controller 10 may determine whether area 11a of memory 11 shows more than a predetermined number of error rates for separate intervals along the tape T1 in cassette C1 exceed the threshold rate. Whichever method is chosen, if, in step 206, it is determined that dubbing of cassette C1 is necessary, the dubbing is performed in step 207 and thereafter control returns to step 204 to determine whether auto dubbing is possible for a next cassette, that is, whether a blank cassette and two VTRs are available for such dubbing. Correspondingly, if in step 206 it is determined that the stored error rate is less than the threshold rate, control bypasses step 207 and returns to step 204 to determine whether auto dubbing is possible for the next cassette.

Figure 5A:
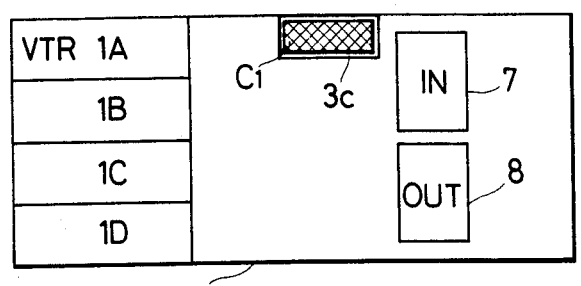
FIGS. 5A-5D are schematic illustrations showing the transfer of cassettes in the apparatus of FIG. 1 during a dubbing operation.
Figure 5B:
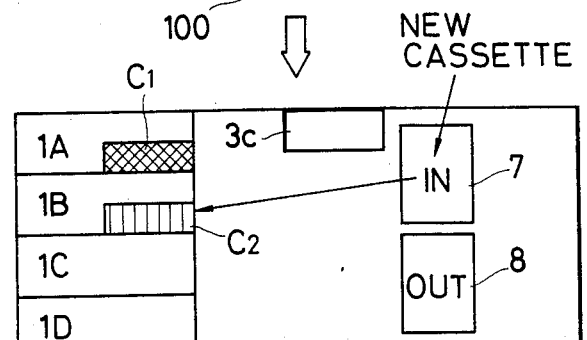
Figure 5C:
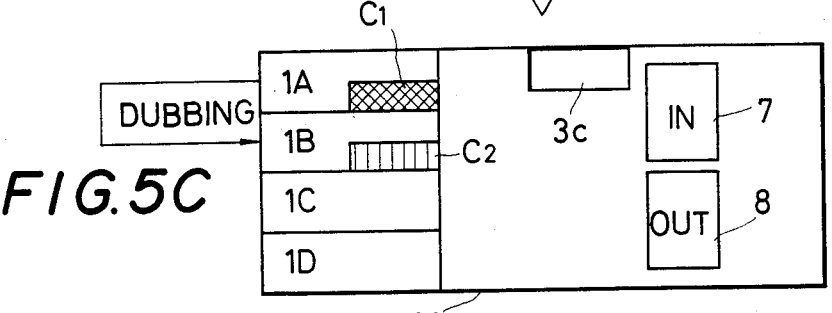
Figure 5D:
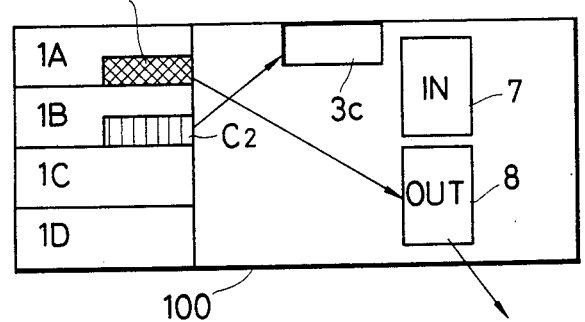

FIG. 4 is a flowchart illustrating the dubbing process of FIG. 3 in more detail. As earlier noted, this process may be started automatically at the end of the broadcast day or may be initiated by actuation of dubbing start pushbutton 39. As shown in FIG. 4, after the dubbing process starts, in step 300 the first cassette identified as being defective, and which is cassette C1 in the present example, is transferred by mechanism 5 from its storage bin 3C to VTR 1A, as schematically illustrated in FIG. 5A. Then, in step 301 it is determined whether a blank cassette is available to receive the signal reproduced from cassette C1 in VTR 1A. If a blank cassette is not available, in step 302 controller 10 transmits an alarm signal to control panel 9 to cause alarm indicator 41 to light up, thereby notifying the operator that a blank cassette must be supplied. In step 303, the operator supplies a new blank cassette through cassette in-port 7 and, in step 304, the blank cassette, for example cassette C2, either available as determined in step 301 or as supplied in step 303, is then transported by carriage 6 of mechanism 5 to VTR 1B, as shown in FIG. 5B. In step 305, dubbing is effected with the signal recorded on the tape in cassette C1 being reproduced in VTR 1A and supplied to VTR 1B for recording by the latter on the tape in cassette C2, as represented in FIG. 5C. When it is determined, in step 306, that dubbing is complete, the used cassette C1 in VTR 1A is transported, in step 307, by carriage 6 of cassette transporting mechanism 5 to out-port 8 and is ejected therethrough. Then, in step 308, cassette C2 in VTR 1B is transported therefrom by carriage 6 of cassette transporting mechanism 5 to storage bin 3C from which cassette C1 had been removed. These operations in steps 307 and 308 are schematically illustrated in FIG. 5D. Lastly, in step 309, controller 10 resets the error rate values stored in the corresponding memory area or address 11a of memory 11 to initial values, for reflecting the fact that cassette C2 which has replaced cassette C1 in storage bin 3C has a corrected signal newly recorded thereon.

Thus, in accordance with the present invention, the error rates of the individual cassettes are detected or measured and stored for each reproduction and those tapes having an error rate exceeding a threshold rate may be automatically identified and dubbed to new cassettes so as to prevent the recorded signal from being degraded to the point of displaying visual errors. It may also be desirable at some point to remove from the storage bins the defective cassettes having error rates exceeding the threshold rate even without dubbing. At this point, eject pushbutton 40 may be actuated to cause all such defective tapes to be identified, removed from the storage and ejected through out-port 8.

Although the above-described automatic dubbing process enables the signal quality of the thousands of cassettes to be effectively continuously monitored and dubs the defective tapes before they become too degraded for correction during reproduction, it may happen that the threshold rate itself, or the characteristics defined for the comparison of the threshold rate to the stored error rates, may allow a cassette producing a visually defective image to slip by without identification. For example, if the automatic process identifies as defective only those cassettes in which the average stored error rate exceeds the threshold rate, it may happen that a severe drop-out or defect at one localized position may completely destroy the image for a moment and yet occur over a sufficiently short period of time so that the average error rate is still lower than the threshold rate. Therefore, in accordance with a further aspect of the present invention, the operator observing the image corresponding to the currently reproduced signal from cassette C1 on, for example, monitor #1 or monitor #2, may actuate on control panel 9 the defect identification pushbutton 38 (FIG. 2A) whenever the operator observes a sufficiently serious defect in the displayed image.

The defect signal generated upon actuation of defect identification pushbutton 38 is supplied to controller 10, which generates in response thereto a flag indicating the presence of an operator-identified defect and then, at memory area 11a corresponding to cassette C1, the flag and a corresponding timing code reproduced from tape T1 and identifying the location of the defect along the tape in cassette C1. Defect identification pushbutton 38 may thereafter be actuated as many times during the reproduction of cassette C1 as the operator finds defects therein, and the subsequent flags and corresponding timing codes are all stored at memory area 11a. In addition, the operator may generate individualized comments on the nature and severity of the defects through actuation of alphanumeric keys 36, and controller 10 receiving the alphanumeric signals therefrom will store the corresponding information in memory area 11a in conjunction with the flag for the particular defect. Thereafter, when reproduction of cassette C1 is completed, the operator can review the number and type of errors by recalling the stored flags and comments by appropriate actuation of function keys 35 to cause the display of this information on display 37. In addition, the operator can review the individual defects themselves by causing tape T1 in cassette C1 to be advanced or rewound to the positions identified by the timing codes stored in memory area 11a along with the flags and comments. If the operator independently determines that cassette C1 should be dubbed, regardless of the error rate therein, he can enter the identification of cassette C1 through alphanumeric keys 35 and cause its individual dubbing. Alternatively, the operator may request that all cassettes having more than a predetermined number of flags stored in the corresponding areas be dubbed, in which case the multiple cassette dubbing process proceeds in accordance with the flowchart of FIG. 4 for the auto dubbing process described above.

It will be recognized that the operator-controlled defect identification process is advantageous even when the reproduced video signal is an analog video signal and the defects occur due to loss of the RF signal or dropout. This aspect of the present invention is therefore not limited in its applications to digital video systems only.

Therefore, by way of summary, in accordance with the present invention, the error rate for each cassette and for each reproduction thereof is automatically generated and stored in a respective memory area and, when the error rate exceeds a threshold rate, each defective cassette may be automatically dubbed onto a blank cassette to insure that deterioration of each tape never exceeds a predetermined amount. In addition, the operator may independently cause any cassette to be dubbed when he deems the image produced therefrom to be too highly degraded regardless of the error rate of the signal therein.

Although a preferred embodiment of the present invention has been described in detail with reference to the drawings, it will be apparent that the invention is not limited to that precise embodiment, and that many modifications and variations may be effected therein by one skilled in the art without departing from the spirit or scope of the invention as defined by the appended claims.

What is claimed is:

1. In an apparatus for automatically supplying and selectively reproducing a plurality of cassettes having digital signals recorded on recording media therein comprising:
   a plurality of digital reproducing/recording means operative for dubbing and having detector means for detecting errors in the digital signals reproduced thereby;
   a cassette housing block having a plurality of bins for storing respective cassettes therein;
   cassette transporting means for selectively transporting cassettes between said bins and said reproducing/recording means; and
   control means for controlling the operation of said reproducing/recording units and said cassette transporting means, said control means comprising:
   memory means having a plurality of memory areas respectively corresponding to said plurality of cassettes and connected to said detector means for storing an error rate of the digital signal reproduced from a selected one of said cassettes in the corresponding memory area;
   comparator means for comparing the stored error rate for said one cassette with a threshold rate and producing an output in response thereto; and
   dubbing control means for controlling dubbing of the digital signal from said one cassette to another of said cassettes in response to said output of said comparator means.

2. Apparatus according to claim 1, wherein said dubbing control means operates automatically in response to said output of said comparator means.

3. Apparatus according to claim 1, further comprising dubbing start means actuable to initiate operation of said dubbing means.

4. Apparatus according to claim 1, wherein said detector means includes a respective detector device included in each of said reproducing/recording means.

5. Apparatus according to claim 1, wherein the dubbing operation is performed digitally.

6. Apparatus according to claim 1, further comprising monitor means for displaying an image corresponding to the digital signal reproduced from said one cassette, and manually actuable input means for generating a defect signal indicating a defect of the displayed image; and wherein said memory means is responsive to said defect signal for storing a flag in said corresponding memory area, and said dubbing control means is responsive to the stored flag to dub said digital signal of said one cassette to said other cassette independently of said stored error rate.

7. Apparatus according to claim 1, wherein said cassette housing block includes an out-port and ejects said one cassette therethrough after dubbing.

8. Apparatus according to claim 1, wherein some of said cassettes are blank and said other cassette is a selected one of said blank cassettes.

9. Apparatus according to claim 8, further comprising alarm means for providing an alarm indication when none of said bins stores a blank cassette.

10. Apparatus according to claim 1, wherein said detector means includes error correction means for correcting errors in the reproduced digital signals, said error rate for each cassette being the number of error corrections performed for each predetermined unit of the respective reproduced digital signal.

11. Apparatus according to claim 10, wherein said detector means further includes concealment means for concealing errors remaining after error correction, and wherein said error rate for each cassette includes the number of error concealments for each said predetermined unit of said respective reproduced digital signal.

12. Apparatus for automatically supplying and selectively reproducing information signals recorded in a plurality of cassettes comprising:
   a plurality of reproducing/recording means;
   a cassette housing block having a plurality of bins for storing respective cassettes therein;
   cassette transporting means for selectively transporting said cassettes between said bins and said reproducing/recording units;
   monitor means for displaying an image corresponding to an information signal reproduced from a selected one of said cassettes by one of said reproducing/recording means;

manually actuable input means for generating a defect signal for each defect observed in the displayed image;

memory means having a plurality of memory areas respectively corresponding to said plurality of cassettes and being responsive to each said defect signal for storing a flag in the one of said memory areas corresponding to said one cassette from which an information signal is being reproduced so that the number of flags stored in each of said memory areas is an indication of the condition of the information signal recorded in the respective cassette; and control means for controlling said cassette transporting means so as to remove from the respective bins those cassettes having at least a predetermined number of said flags stored in their respective memory areas.

13. Apparatus according to claim 12; wherein said cassette housing block includes an out-port, and said cassette transporting means ejects the removed cassettes through said out-port.

14. Apparatus for automatically supplying and selectively reproducing information signals recorded in a plurality of cassettes comprising:

a plurality of reproducing/recording means;

a cassette housing block having a plurality of bins for storing respective cassettes therein;

cassette transporting means for selectively transporting said cassettes between said bins and said reproducing/recording units;

monitor means for display an image corresponding to an information signal reproduced from a selected one of said reproducing/recording means;

manually actuable input means for generating a defect signal for each defect observed in the displayed image;

memory means having a plurality of memory areas respectively corresponding to said plurality of cassettes and being responsive to each said defect signal for storing a flag in the one of said memory areas corresponding to said one cassette from which an information signal is being reproduced so that the number of flags stored in each of said memory areas is an indication of the condition of the information signal recorded in the respective cassette; and dubbing control means for controlling said cassette transporting means and said reproducing/recording means to dub the information signal recorded on said one cassette to another of said cassettes in response to a predetermined number of said flags stored in said one memory area corresponding to said one cassette.

15. An apparatus according to claim 14 wherein some of the cassettes stored in said bins are blank; and further comprising manually actuable second input means for generating a dubbing start signal, said dubbing control means being responsive to said dubbing start signal to identify each of said cassettes for which said predetermined number of said flags are stored in the respective memory area and to dub the information signal recorded in each of said identified cassettes to a respective blank cassette.

16. An apparatus according to claim 14; wherein said dubbing control means automatically dubs the signal recorded on said one cassette to the other cassette at a time when any two of said recording/reproducing means are available.

17. Apparatus for automatically supplying and selectively reproducing information signals recorded in a plurality of cassettes comprising:

a cassette housing block having a plurality of bins for storing respective cassettes therein;

reproducing means for selectively reproducing the information signals from said cassettes.

cassette transporting means for selectively transporting said cassettes between said bins and said reproducing means;

means for generating a defect signal when a defect is detected in the information signal being reproduced from any selected one of said cassettes; and memory means having a plurality of memory areas respectively corresponding to said plurality of cassettes and being responsive to each said defect signal for storing defect data in the one of said memory areas corresponding to the respective cassette having the defect and from which the information signal is being reproduced.

18. Apparatus for automatically supplying and selectively reproducing a plurality of cassettes comprising:

a cassette housing block having a plurality of bins for storing respective cassettes therein;

reproducing means for selectively reproducing said cassettes;

cassette transporting means for selectively transporting said cassettes between said bins and said reproducing means;

monitor means for displaying an image corresponding to an information signal reproduced from a selected one of said cassettes by said reproducing means;

manually actuable input means for generating a defect signal when a defect is observed in the displayed image; and memory means having a plurality of memory areas respectively corresponding to said plurality of cassettes and being responsive to each said defect signal for storing defect data in the one of said memory areas corresponding to said selected one cassette from which an information signal is being reproduced.

* * * * *